United States Patent
Joshi et al.

(10) Patent No.: US 11,437,800 B2
(45) Date of Patent: Sep. 6, 2022

(54) ADAPTER ASSEMBLIES AND ARRANGEMENTS FOR MOUNTING CABLES

(71) Applicant: CommScope Technologies LLC, Hickory, NC (US)

(72) Inventors: Aviral Joshi, Chicago, IL (US); Ronald A. Vaccaro, Taylorsville, NC (US); Christopher Stockman, Bella Vista, AR (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/142,780

(22) Filed: Jan. 6, 2021

(65) Prior Publication Data
US 2021/0305797 A1 Sep. 30, 2021

Related U.S. Application Data

(60) Provisional application No. 62/994,940, filed on Mar. 26, 2020.

(51) Int. Cl.
*H02G 3/32* (2006.01)
*F16L 3/13* (2006.01)

(52) U.S. Cl.
CPC . *H02G 3/32* (2013.01); *F16L 3/13* (2013.01)

(58) Field of Classification Search
CPC .. H02G 3/32; H02G 3/30; H02G 7/053; F16L 3/13; F16L 3/127; F16L 3/222; F16L 3/1058; F16L 21/078; F16B 21/065
See application file for complete search history.

(56) References Cited

U.S. PATENT DOCUMENTS

| | | | |
|---|---|---|---|
| 6,257,530 B1 * | 7/2001 | Tsai | F16L 3/127 248/73 |
| 8,191,836 B2 | 6/2012 | Korczak | |
| 9,853,434 B2 | 12/2017 | Vaccaro | |
| 9,866,044 B1 | 1/2018 | Bell | |
| 9,903,510 B2 | 2/2018 | Joshi | |
| 10,253,906 B2 | 4/2019 | Vaccaro | |
| 10,415,723 B2 | 9/2019 | Vaccaro et al. | |

(Continued)

FOREIGN PATENT DOCUMENTS

WO WO-2017079020 A1 * 5/2017 ............. F16B 15/00

*Primary Examiner* — Terrell L McKinnon
*Assistant Examiner* — Ding Y Tan
(74) *Attorney, Agent, or Firm* — Myers Bigel, P.A.

(57) ABSTRACT

An adapter for mounting cable hangers to a mounting structure includes: a plurality of mounting panels including a mounting hole, the mounting panels attached to each other at edges thereof and being disposed at an angle relative to its adjacent mounting panels; two base segments, each attached to the edge of an endmost one of the mounting panels and extending therefrom toward each other, the base segments and the mounting panels defining an interior region of the adapter; and first and second locking arms, each locking arm extending from an end of one of the base segments and including a locking feature, the first locking arm extending generally parallel to the second locking arm and defining a gap therebetween; and a reinforcement unit including a flexible arm and a stop configured to fit within the gap and inhibit deflection of the locking arms.

11 Claims, 7 Drawing Sheets

(56) References Cited

U.S. PATENT DOCUMENTS

| | | |
|---|---|---|
| 10,851,916 B2 | 12/2020 | Vaccaro et al. |
| 2009/0230256 A1* | 9/2009 | Widlacki ................ F16L 3/222 |
| | | 248/68.1 |
| 2009/0294602 A1* | 12/2009 | Korczak ................. H02G 3/30 |
| | | 248/74.2 |
| 2011/0226913 A1* | 9/2011 | Feige ........................ F16L 3/12 |
| | | 248/74.2 |
| 2016/0281881 A1* | 9/2016 | Vaccaro ............. G09F 15/0018 |
| 2016/0281883 A1* | 9/2016 | Vaccaro ................... F16B 1/00 |
| 2018/0045336 A1* | 2/2018 | Vaccaro ................. F16L 3/133 |
| 2018/0138678 A1* | 5/2018 | Vaccaro .................. H02G 3/32 |
| 2018/0202580 A1* | 7/2018 | Joshi ......................... F16L 3/13 |
| 2019/0383426 A1* | 12/2019 | Vaccaro ................... F16L 3/00 |
| 2020/0041039 A1* | 2/2020 | Varale ...................... H02G 3/32 |
| 2020/0099212 A1* | 3/2020 | Bell ....................... H02G 7/053 |
| 2020/0208757 A1 | 7/2020 | Joshi et al. |
| 2020/0340548 A1* | 10/2020 | Bell ......................... H02G 3/30 |

\* cited by examiner

ADAPTER ASSEMBLIES AND ARRANGEMENTS FOR MOUNTING CABLES

RELATED APPLICATION

The present application claims priority from and the benefit of U.S. Provisional Patent Application No. 62/994,940, filed Mar. 26, 2020, the disclosure of which is hereby incorporated by reference herein in its entirety.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and other structures. Generally, each cable is attached to a structural member by cable hangers mounted at periodically-spaced attachment points.

Antenna towers may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger.

One variety of cable hanger of this type is the SNAP-STAK® hanger, available from CommScope, Inc. (Joliet, Ill.). Other cable hangers are shown in U.S. Pat. Nos. 9,866,044, 9,853,434, and 9,903,510, the disclosures of each of which are hereby incorporated herein by reference in full.

Another available stackable cable hanger is discussed in U.S. Patent Publication No. 2018/0045336 to Vaccaro, the disclosure of which is hereby incorporated herein by reference in its entirety. This cable hanger (versions of which are available from CommScope, Inc. under the name SNAPTAK™) is formed of a polymeric material and is typically employed for smaller cables. In addition, the polymeric SNAPTAK™ hanger can reduce or eliminate passive intermodulation (PIM) near an antenna. PIM, which can negatively impact antenna performance, can be caused by a variety of factors, one of which is metal-to-metal interfaces of components near the antenna. Using a polymeric hanger that is mounted on a metallic antenna mount or other structure can eliminate potential PIM that might otherwise be caused by a metal hanger mounted to a metal antenna leg.

Figure 1:
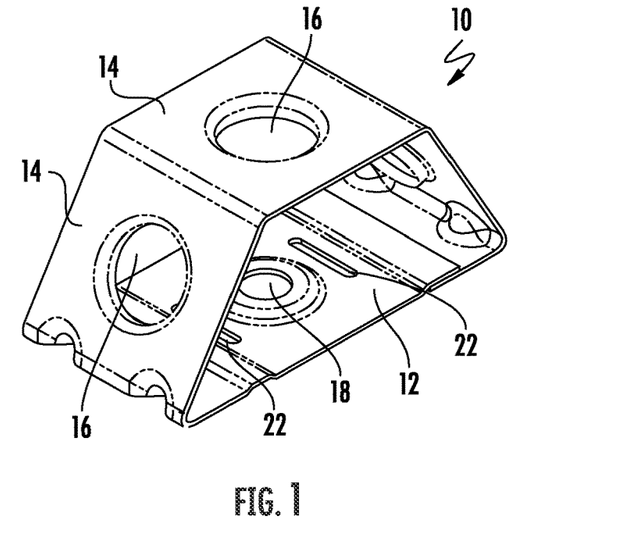
FIG. 1 is a perspective view of a prior art adapter for cable hangers.

In some instances, it may be desirable to mount multiple stacks of cable hangers in close proximity. In such instances, it may be desirable to employ an adapter, such as that shown at 10 in FIG. 1. The adapter 10 has a trapezoidal profile, with a base panel 12 and three serially-attached mounting panels 14. Each of the mounting panels 14 includes a mounting hole 16 (typically a nominal ⅝ inch hole) that can receive a cable hanger such as those described above, one of which is designated 20 in FIG. 2. The base panel 12 of the adapter 10 has a hole 18 that can be used to mount the adapter 10 to a mounting structure via a bolt. The base panel 12 also includes slots 22 on either side of the hole 18 that can receive a hose clamp 26 or the like to mount the adapter 10 to a pole 24, as shown in FIG. 3. This mounting approach may be desirable when the pole 24 has no pre-formed holes to receive a typical cable hanger.

Additional adapters are described in, for example, U.S. Pat. Nos. 10,415,723 and 10,851,916 and U.S. Patent Publication Nos. 2018/0138678, 2018/0202580, and 2020/0208757, the disclosures of which are hereby incorporated herein by reference in full. The latter two documents listed above are directed to polymeric adapters that may assist in the reduction or elimination of PIM.

It may be desirable to provide additional configurations for mounting cables, particularly in a manner that can reduce or eliminate PIM.

SUMMARY

As a first aspect, embodiments of the invention are directed to an adapter for mounting cable hangers to a mounting structure. The adapter comprises: a plurality of mounting panels, each mounting panel including a mounting hole, the mounting panels attached to each other at edges thereof, each mounting panel being disposed at an angle relative to its adjacent mounting panels; two base segments, each of the base segments attached to the edge of an endmost one of the mounting panels and extending therefrom toward another of the base segments, the base segments and the mounting panels defining an interior region of the adapter; and first and second locking arms, each of the locking arms extending from an end of a respective one of the base segments, each of the locking arms including a locking feature, the first locking arm extending generally parallel to the second locking arm and defining a gap therebetween. In the deflected state the adapter may be mounted to a mounting structure, with the locking arms inserted through a hole in the mounting structure and exerting outward pressure on edges of the hole, the locking features being configured to maintain the adapter in a mounted position on the mounting structure. The adapter further comprises a reinforcement unit, the reinforcement unit including a flexible arm and a stop, the stop configured to fit within the gap and inhibit deflection of the locking arms when they are mounted in the hole of the mounting structure.

As a second aspect, embodiments of the invention are directed to an adapter for mounting cable hangers to a mounting structure comprising: a plurality of mounting panels, each mounting panel including a mounting hole, the mounting panels attached to each other at edges thereof, each mounting panel being disposed at an angle relative to its adjacent mounting panels; a base attached at each end to the edge of an endmost one of the mounting, the base and the mounting panels defining an interior region of the adapter, wherein first and second band holes separated by a cross-member are present in the base; and a locking arm unit including a foundation and first and second locking arm extending from the base, each of the locking arms including a locking feature, the first locking arm extending generally parallel to the second locking arm and defining a gap therebetween. The locking arm unit is attached via a spring arm within the interior region and positioned such that each of the first and second locking arms aligns with a respective first and second band hole, the locking arm unit configured so that the first and second locking arms can be moved to extend through the first and second band holes.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 4:
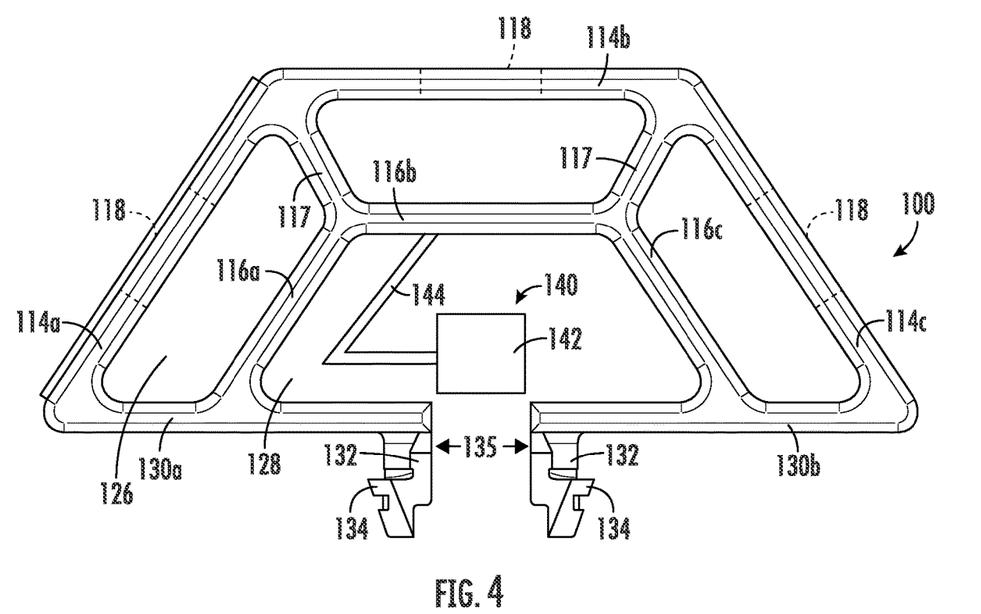
FIG. 4 is a side view of an adapter for cable hangers according to embodiments of the invention.
Figure 5:
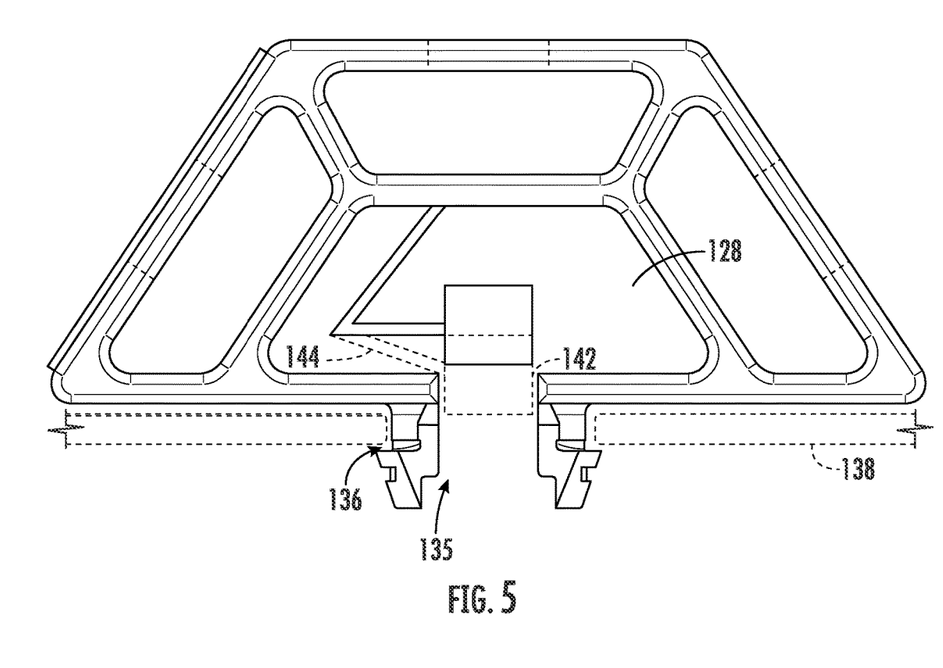
FIG. 5 is a side view of the adapter of FIG. 4 with the stop of the reinforcing unit positioned between the locking arms.

Referring now to the drawings, a snap-in adapter for a cable hanger, designated broadly at 100, is shown in FIGS. 4 and 5. The adapter 100 has three mounting panels 114a, 114b, 114c, each with a hole 118 (typically a nominal ⅝ inch hole), similar to the mounting panels 14 discussed above. The mounting panels 114a-c are serially arranged, with each mounting panel 114a-c sharing at least one end edge with at least one end edge of another mounting panel 114a-c. The adapter 100 does not have a base panel that spans the rear edges of the mounting panels 114a, 114c. Instead, the adapter 100 has two base segments 130a, 130b that extend inwardly from the rear edges of the endmost mounting panels 114a, 114c. A locking arm 132 extends rearwardly from the inward edge of each of the base segments 130a, 130b. The locking arms 132 are arcuate in profile and are generally parallel to each other and form a gap 135 therebetween. Hooks 134 extend laterally from the rear ends of the locking arms 132. The mounting panels 114a-c and the base segments 130a, 130b define a generally trapezoidal interior region 126.

As can be seen in FIG. 4, the adapter 100 also includes braces 116a, 116b, 116c that are generally parallel with, respectively, the mounting panels 114a, 114b, 114c. Dividers 117 extend between the vertices of the mounting panels 114a-c and the braces 116a-c. The braces 116a-c, the base segments 130a, 130b and the gap 135 define a generally trapezoidal window 128.

A reinforcing unit 140 is mounted within the window 127. As can be seen in FIG. 4, the reinforcing unit 140 includes a stop 142 that is mounted to the brace 116b via a flexible arm 144. The stop 142 may be a block as shown, a bar or plate, or make take another form. The flexible arm 144 may be V-shaped as shown or may take another form that enables the stop 142 to be moved into the gap 135 between the locking arms 132.

In some embodiments, the adapter 100 is formed of a polymeric material, such as acetal, polyethylene, polypropylene, PVC, or the like. The adapter 100 may be formed by injection molding.

In use, the adapter 100 is mounted to a mounting surface 138 (see FIG. 5), such as a monopole, antenna leg, antenna mount, or the like, by inserting the locking arms 132 into a mounting hole 136 (typically a mounting hole having a nominal diameter of ⅝ inch). The locking arms 132 deflect (in some instances aided also by deflection of the base segments 130a, 130b) during insertion into the mounting hole, then recover toward their original positions as the hooks 134 "clear" the mounting surface.

Notably, the technician has the option of reinforcing the mounting of the adapter 100 in the hole by moving the stop 142 of the reinforcement unit 140 into the gap 135 between the locking projections 132 (see in broken line in FIG. 5). The stop 142 is sized and configured to fit between the locking projections 132 and to prevent the locking projections 132 from deflecting inwardly (which could otherwise enable the adapter 100 to loosen and detach from the mounting surface). Because the stop 142 is attached to the remainder of the adapter 100 via the flexible arm 144, it is conveniently available to the technician handling the adapter 100, and the flexibility of the flexible arm 144 can enable the stop 142 to be moved from its original position within the window 128 to the gap 135.

Figure 2:
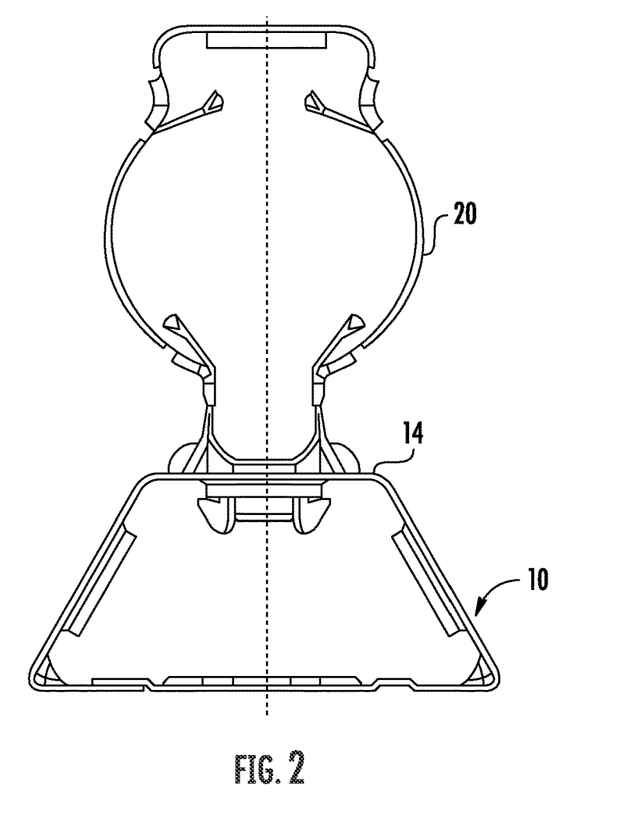
FIG. 2 is a top view of the adapter of FIG. 1 with a cable hanger mounted therein.
Figure 3:
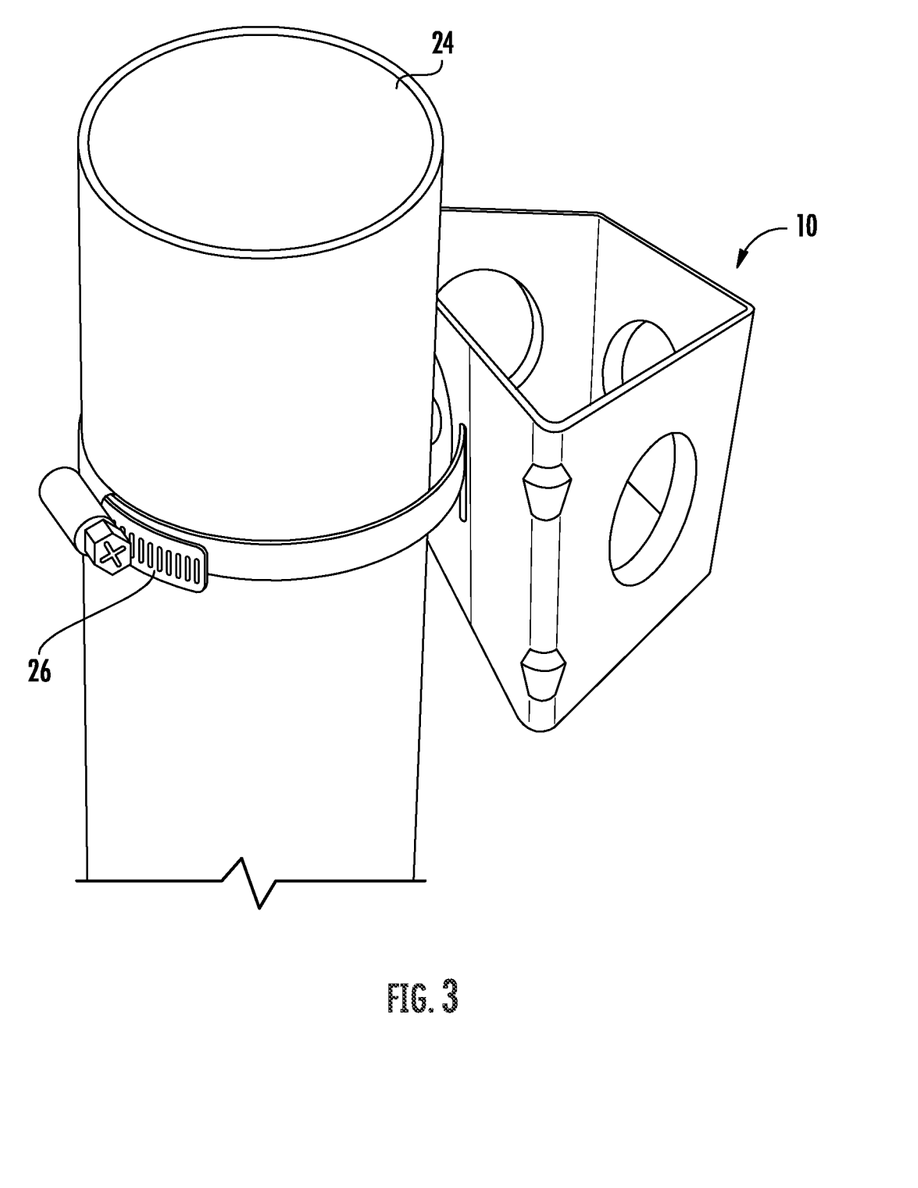
FIG. 3 is a perspective view of the adapter of FIG. 1 mounted to a pole via a hose clamp.

Once it is mounted to the mounting surface, the adapter 100 is then positioned to serve as a mounting point (via the mounting holes 118) for cable hangers, such as that shown in FIG. 2. Adapters 100 formed of a polymeric material can be used to mount a metallic cable hanger without creating a potential site of undesirable PIM. Of course, those skilled in this art will appreciate that the polymeric cable hangers, such as those described in U.S. Pat. No. 10,253,906, issued Apr. 9, 2019 (incorporated by reference in full herein), may also be employed.

In addition, the adapter 100 may serve as a mounting point for other mounting components. For example, the adapter 100 may serve as a mounting location for another cable hanger adapter.

Figure 6:
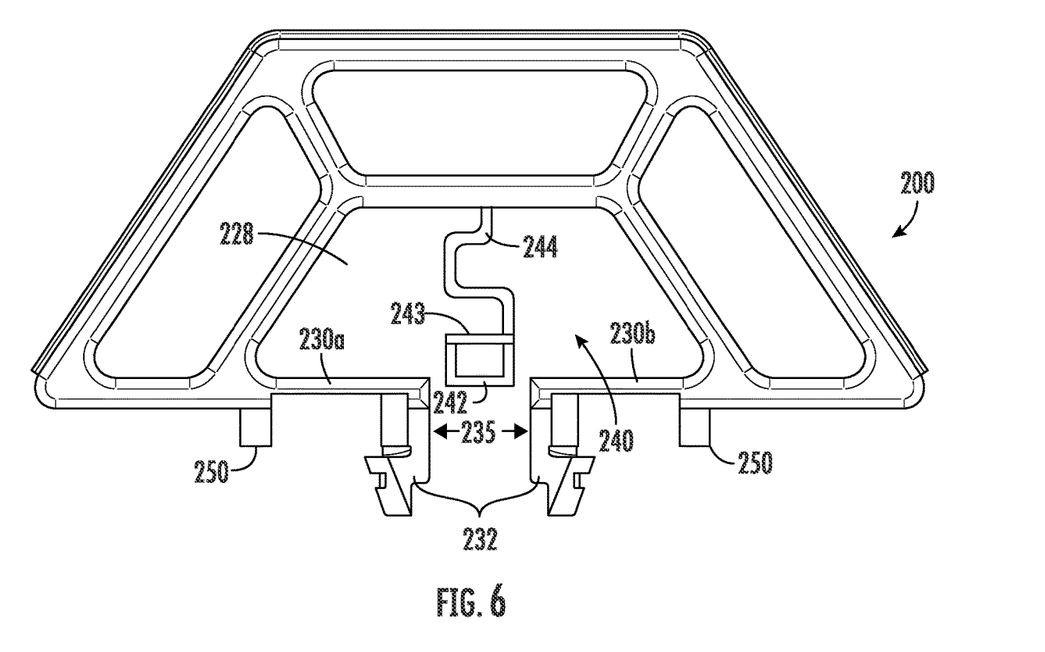
FIG. 6 is a side view of an adapter for cable hangers according to additional embodiments of the invention.
Figure 7:
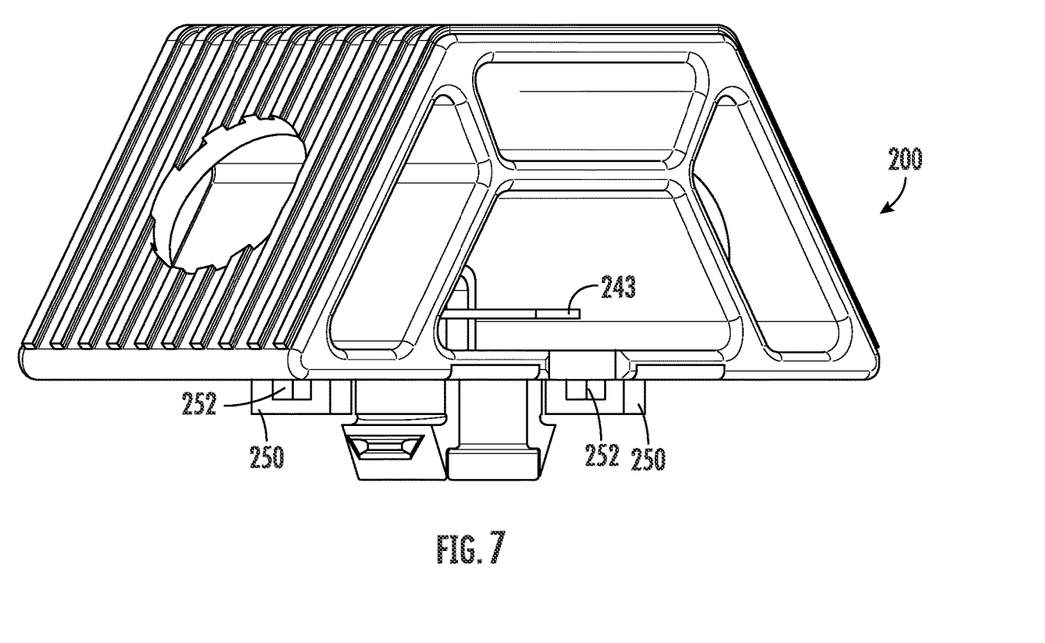
FIG. 7 is a side perspective view of the adapter of FIG. 6.
Figure 8:
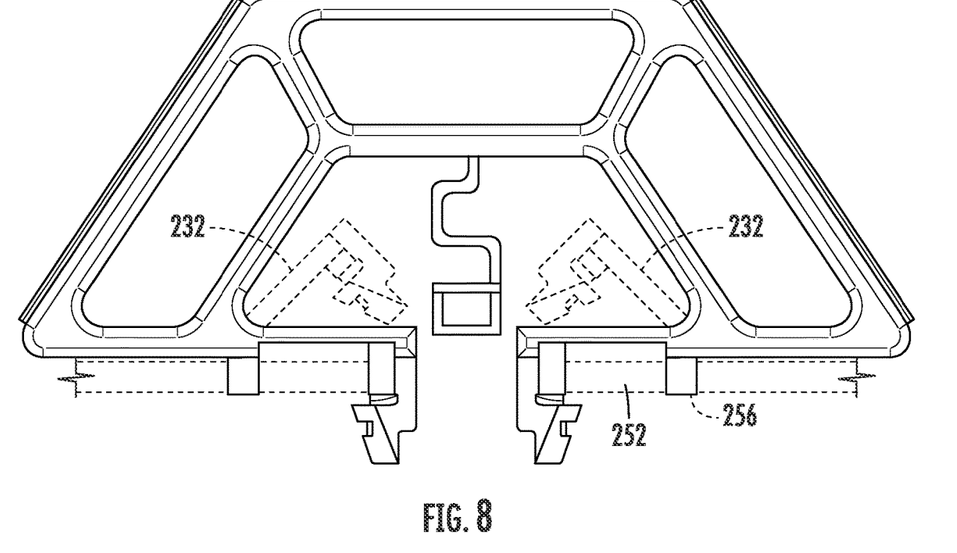
FIG. 8 is a side view of the adapter of FIG. 6 showing the band of a hose clamp and the deflection of the locking arms in broken line.

Referring now to FIGS. 6-8, another cable hanger adapter, designated broadly at 200, is shown therein. The adapter 200 is similar to the adapter 100, but differs in at least three ways. First, the reinforcement unit 240 includes a flexible arm 244 that is serpentine, or S-shaped, rather than V-shaped like the flexible arm 144 shown above. The shape of the flexible arm 244 may facilitate the movement of the stop 242 directly into the gap 235 between the locking arms 232.

Second, the stop 242 is hollow and includes a bar 243 that is positioned to align with the base segments 230s, 230b once the stop 242 is moved into the gap 235.

Third, the adapter 200 includes two projections 250, each of which extends rearwardly from a respective base segment 230a, 230b. A slot 252 is present in each of the projections 250. The slots 252 are present to enable a technician to mount the adapter 200 on a mounting structure (such as a monopole) via the band of a hose clamp 256 or the like; the hose clamp is inserted through the slots 252, then wrapped around the mounting structure to mount the adapter thereto. In such an instance, the portions of the base segments 230a, 230b that are inward of the projections 250 (which are thinner than the remainder of the base segments 230a, 230b) are able to deflect into the window 228, thereby moving out of the way and allowing the hose clamp 256 or other band to be routed between the slots 252 without interference. Thus, a technician has the option of mounting the adapter 200 via the locking arms 232 or a hose clamp 256, depending on whether a mounting hole is present in the mounting structure.

In some embodiments, the adapter 200 is formed of a polymeric material, such as acetal, polyethylene, polypropylene, PVC, or the like. The adapter 200 may be formed by injection molding.

Those of skill in this art will also appreciate that the flexible arm of the reinforcement unit may be attached to a different location on the adapters 100, 200. For example, the flexible arm may be attached to one of the peripheral braces 116a, 116c, 216a, 216c, or to one of the mounting panels 114a-c, 214a-c if no braces are present.

Figure 9:
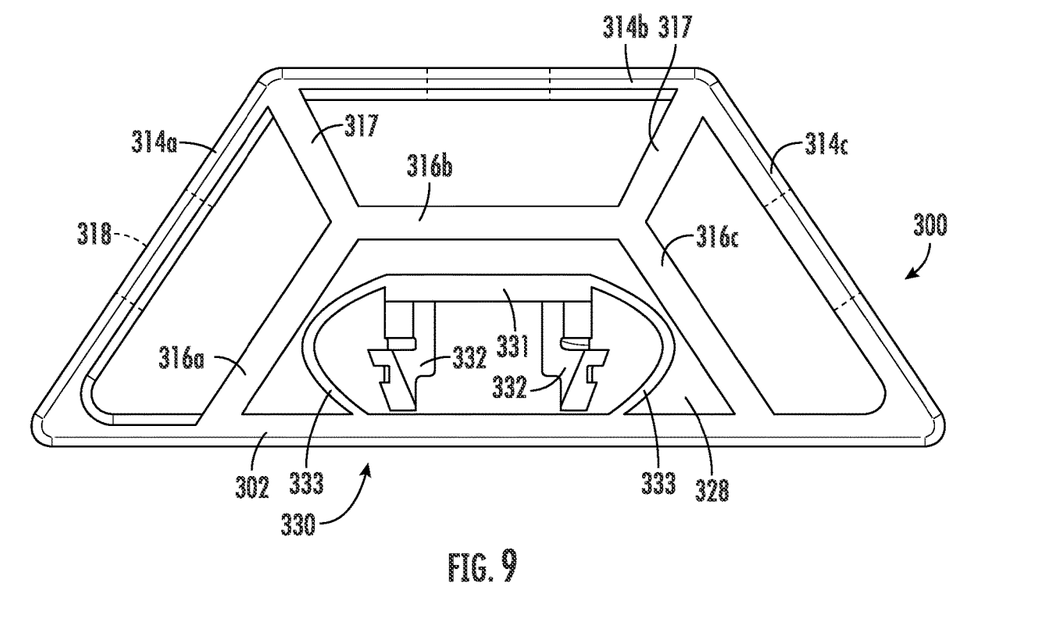
FIG. 9 is a side view of an adapter for cable hangers according to further embodiments of the invention.
Figure 10:
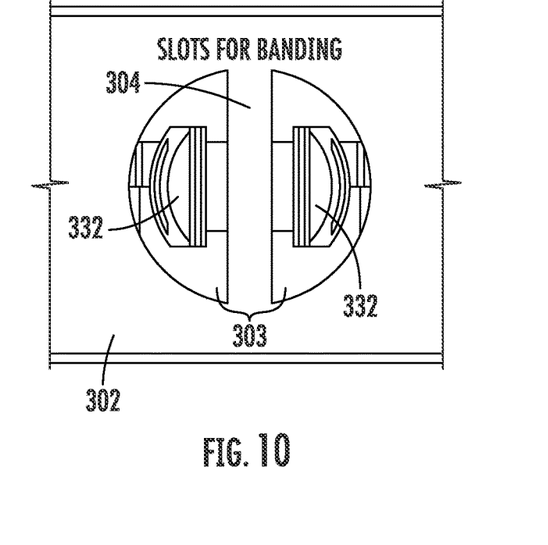
FIG. 10 is a rear view of the adapter of FIG. 9.

Referring now to FIGS. 9-12, another embodiment of a cable hanger adapter, designated broadly at 300, is shown therein. The adapter 300 is similar to the adapter 100 in that it has three mounting panels 314a, 314b, 314c, each with a hole 318 (typically a nominal ¾ inch hole). The adapter 300 includes a base 302 that spans the ends of the mounting panels 314a and 314c. As can be seen in FIG. 10, two semicircular band holes 303 are present in the base 302 and are separated by a cross-member 304. The adapter 300 also includes three braces 316a-c and two dividers 317.

Within the window 328 formed by the braces 316a-c and the base 302, the adapter 300 also includes a locking arm unit 330. The locking arm unit 330 includes a foundation 331 and two locking arms 332 that extend generally perpendicularly to the foundation 331. A spring arm 333 is attached to each end of the foundation 331 and to the base 302. As shown in FIGS. 9 and 10, the locking arm unit 330 is positioned within the window 328 so that the locking arms 332 are aligned with the holds 303 in the base 302.

Figure 11:
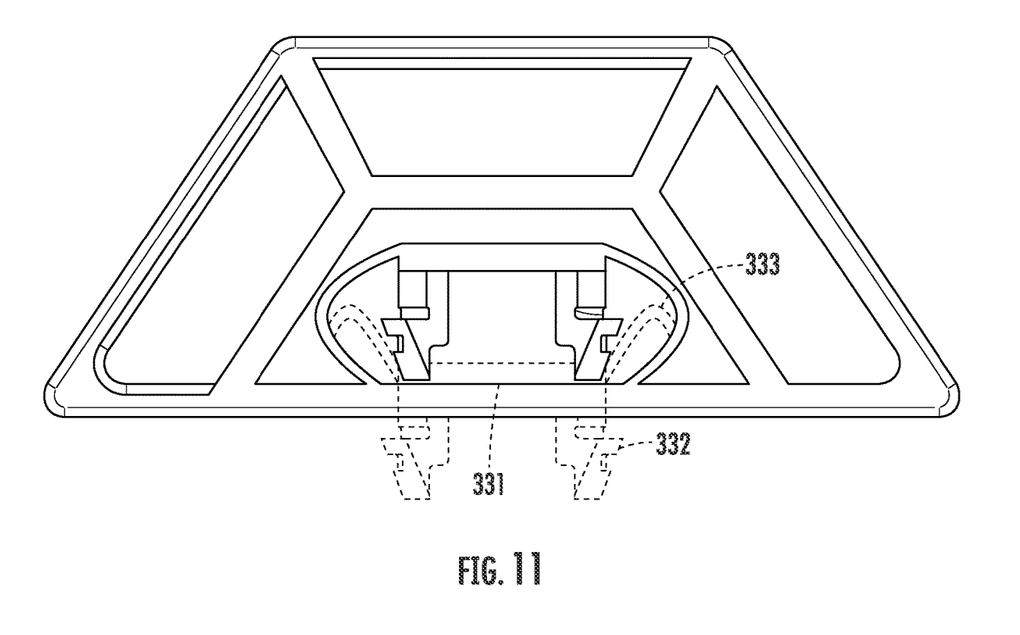
FIG. 11 is a side view of the adapter of FIG. 9 showing in broken line the locking arms in an extended position.

Like the adapter 200 above, the adapter 300 allows the technician to select whether the adapter 300 is to be mounted via a hose clamp or with the locking arm unit 330. If there is a mounting hole present in the mounting surface, the technician can apply a force on the foundation 331 of the locking arm unit 330 that forces the locking arms 332 through the band holes 303 in the base 302. From this position, the locking arms 332 can be inserted into the mounting hole in the mounting surface to attach the adapter thereto.

Figure 12:
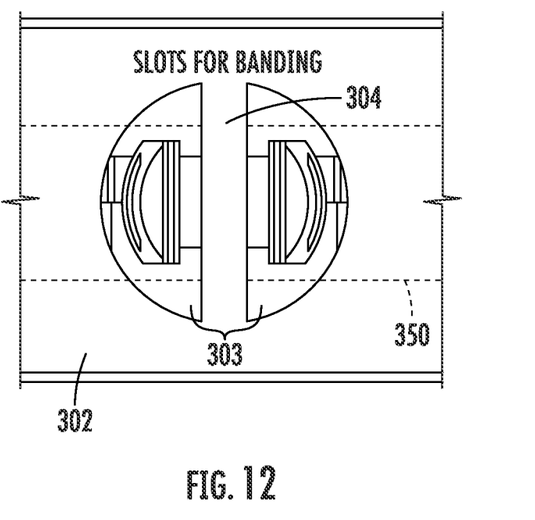
FIG. 12 is a rear view of the adapter of FIG. 9 showing the band of a hose clamp in broken line.

Alternatively, if there is no mounting hole in the mounting surface, the technician may attach the adapter using a hose clamp. The band 350 of the hose clamp can be inserted through one of the holes 303 and into the window 328, then threaded out of the opposite hole to capture the adapter 300. The hose clamp can then be attached around the mounting surface (e.g., a monopole).

In some embodiments, the adapter 300 is formed of a polymeric material, such as acetal, polyethylene, polypropylene, PVC, or the like. The adapter 300 may be formed by injection molding.

Although the adapters 100, 200, 300 take generally a trapezoidal profile, those skilled in this art will appreciate that the adapters may be configured to take other profiles. For example, the mounting panels 114a, 114c may be generally perpendicular to the mounting panel 114b, such that the adapter has a square or rectangular profile. In other embodiments, the adapter may have only two mounting panels and therefore have a triangular profile. Pentagonal, hexagonal, and other profile shapes are also contemplated. In addition, in some embodiments the braces and dividers may be omitted, or more of each may be present.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An adapter for mounting cable hangers to a mounting structure, comprising:
   a plurality of mounting panels, each mounting panel including a mounting hole, the mounting panels attached to each other at edges thereof, each mounting panel being disposed at an angle relative to its adjacent mounting panels;
   two base segments, each of the base segments attached to the edge of an endmost one of the mounting panels and extending therefrom toward another of the base segments, the base segments and the mounting panels defining an interior region of the adapter; and
   first and second locking arms, each of the locking anus extending from an end of a respective one of the base segments, each of the locking arms including a locking feature, the first locking arm extending generally parallel to the second locking arm and defining a gap therebetween;
   wherein in the deflected state the adapter is configured to be mounted to a mounting structure, with the locking arms inserted through a hole in the mounting structure and exerting outward pressure on edges of the hole, the locking features being configured to maintain the adapter in a mounted position on the mounting structure;

and further comprising a reinforcement unit, the reinforcement unit including a flexible arm and a stop, the stop configured to fit within the gap and inhibit deflection of the locking arms when the locking arms are mounted in the hole of the mounting structure;

wherein the adapter is formed as a unitary component of a polymeric material;

further comprising projections on the base segments and slots in the projections.

2. The adapter defined in claim 1, further comprising at least one brace in the interior region.

3. The adapter defined in claim 2, wherein the flexible arm is attached to the brace.

4. The adapter defined in claim 3, wherein the brace underlies a central mounting panel.

5. The adapter defined in claim 1, wherein the flexible arm is generally V-shaped.

6. The adapter defined in claim 1, wherein the flexible arm is sinuous.

7. The adapter defined in claim 1, in combination with a band threaded through the slots.

8. An adapter for mounting cable hangers to a mounting structure, comprising:

a plurality of mounting panels, each mounting panel including a mounting hole, the mounting panels attached to each other at edges thereof each mounting panel being disposed at an angle relative to its adjacent mounting panels;

a base attached at each end to the edge of an endmost one of the mounting panels, the base and the mounting panels defining an interior region of the adapter, wherein first and second band holes separated by a cross-member are present in the base; and a locking arm unit including a foundation and first and second locking arms extending from the base, each of the locking anus including a locking feature, the first locking arm extending generally parallel to the second locking arm and defining a gap therebetween;

wherein the locking arm unit is attached via a spring arm within the interior region and positioned such that each of the first and second locking arms aligns with a respective first and second band hole, the locking arm unit configured so that the first and second locking arms are configured to be moved to extend through the first and second band holes;

wherein the adapter is formed as a unitary component of a polymeric material;

further comprising at least one brace in the interior.

9. The adapter defined in claim 8, wherein the spring arm is attached to the brace.

10. The adapter defined in claim 9, wherein the brace underlies a central mounting panel.

11. The adapter defined in claim 8, in combination with a band threaded through the first and second band holes.

* * * * *

UNITED STATES PATENT AND TRADEMARK OFFICE
CERTIFICATE OF CORRECTION

| | | |
|---|---|---|
| PATENT NO. | : 11,437,800 B2 | Page 1 of 1 |
| APPLICATION NO. | : 17/142780 | |
| DATED | : September 6, 2022 | |
| INVENTOR(S) | : Joshi et al. | |

It is certified that error appears in the above-identified patent and that said Letters Patent is hereby corrected as shown below:

In the Claims

Column 6, Line 59, Claim 1: delete "locking anus" and insert --locking arms--

Column 8, Line 1, Claim 8: delete "thereof each" and insert --thereof, each--

Column 8, Line 11, Claim 8: delete "locking anus" and insert --locking arms--

Signed and Sealed this
Twentieth Day of December, 2022

*Katherine Kelly Vidal*

Katherine Kelly Vidal
*Director of the United States Patent and Trademark Office*